United States Patent [19]

Schneider et al.

[11] Patent Number: 5,495,777
[45] Date of Patent: Mar. 5, 1996

[54] STEERING COLUMN FOR MOTOR VEHICLE

[75] Inventors: Douglas M. Schneider, Bridgeport; Robert E. Tuggle, Saginaw, both of Mich.

[73] Assignee: General Motors Corporation, Detroit, Mich.

[21] Appl. No.: 217,817

[22] Filed: Mar. 25, 1994

[51] Int. Cl.$^6$ .................................................. B62D 1/18
[52] U.S. Cl. .......................... 74/492; 188/374; 280/777
[58] Field of Search ............................... 280/777, 775; 74/492, 493; 188/374, 376, 371

[56] References Cited

U.S. PATENT DOCUMENTS

| | | | |
|---|---|---|---|
| 3,392,599 | 7/1968 | White | 74/492 |
| 3,457,800 | 7/1969 | Toshida et al. | 280/777 |
| 3,538,783 | 11/1970 | Butts | 74/492 |
| 3,665,777 | 5/1972 | Jensen | 74/492 |
| 3,757,601 | 9/1973 | Burke | 74/492 |
| 3,788,148 | 1/1974 | Connell et al. | 74/492 |
| 3,815,438 | 6/1974 | Johnson | 74/492 |
| 4,006,647 | 2/1977 | Oonuma et al. | 74/492 |

Primary Examiner—Rodney H. Bonck
Assistant Examiner—Troy Grabow
Attorney, Agent, or Firm—Saul Schwartz

[57] ABSTRACT

A motor vehicle steering column including a tubular lower mast jacket anchored on a vehicle body, a tubular upper mast jacket telescoped inside the tubular lower mast jacket, a plurality of steel spheres interference fitted in an annulus defined an overlap between the mast jackets, and a plastic ball sleeve in the annulus having pockets loosely receiving respective ones of the steel spheres. The ball sleeve has a plurality of notches in an edge thereof exposed through an outboard end of the lower mast jacket. An anti-rotation bracket is welded to a stationary mounting bracket attached to the lower mast jacket and includes a plurality of tangs which project through the outboard end of the lower mast jacket into respective ones of the notches in the ball sleeve whereby rotation of the ball sleeve about a longitudinal centerline of the steering column is positively foreclosed. With the ball sleeve blocked against rotation, the magnitude of turning moment which must be applied to the upper mast jacket to twist it relative to the lower mast jacket, e.g. to defeat an anti-theft system on the steering column, is sufficient to prevent defeat of the anti-theft system without also causing collateral steering column damage sufficient to render the vehicle undriveable anyway.

5 Claims, 2 Drawing Sheets

5,495,777

1
STEERING COLUMN FOR MOTOR VEHICLE

FIELD OF THE INVENTION

This invention relates to steering columns for motor vehicles.

BACKGROUND OF THE INVENTION

In a motor vehicle steering column described in U.S. Pat. No. 3,392,599, issued 16 Jul. 1968 and assigned to the assignee of this invention, steel spheres are interference fitted in an annulus defined between a lower tubular mast jacket anchored to the vehicle body and an upper tubular mast jacket telescopically enveloping the lower tubular mast jacket and attached to the vehicle body through releasable capsules. The spheres roll tracks in the mast jackets during relative telescopic collapse between the mast jackets to absorb energy and are loosely disposed in pockets in a tubular plastic ball sleeve which maintains the relative positions of the spheres as they roll between the mast jackets. U.S. Pat. No. 3,815,438, issued 11 Jun. 1974 and assigned to the assignee of this invention, describes a similar motor vehicle steering column except that the relationship between the mast jackets is reversed relative to the relationship described in the aforesaid U.S. Pat. No. 3,392,599, i.e. the tubular upper mast jacket is telescoped inside the tubular lower mast jacket. A motor vehicle steering column according to this invention is an improvement relative to the steering column described in the aforesaid U.S. Pat. No. 3,815,438.

SUMMARY OF THE INVENTION

This invention is a new and improved motor vehicle steering column including a tubular lower mast jacket anchored on a vehicle body, a tubular upper mast jacket telescoped inside the tubular lower mast jacket, a plurality of steel spheres interference fitted in an annulus defined at an overlap between the mast jackets, and a plastic ball sleeve in the annulus having pockets loosely receiving respective ones of the steel spheres. In the steering column according to this invention, the ball sleeve has a plurality of notches in an edge thereof exposed through an outboard end of the lower mast jacket. An anti-rotation bracket is welded to a stationary mounting bracket attached to the lower mast jacket and includes a plurality of tangs which project through the outboard end of the lower mast jacket into respective ones of the notches in the ball sleeve whereby rotation of the ball sleeve is positively foreclosed. With the ball sleeve blocked against rotation, the magnitude of turning moment which must be applied to the upper mast jacket to twist it relative to the lower mast jacket, e.g. to defeat an anti-theft system on the steering column, is sufficient to prevent defeat of the anti-theft system without also causing collateral steering column damage sufficient to render the vehicle undriveable anyway.

2
DESCRIPTION OF A PREFERRED EMBODIMENT

Figure 1:
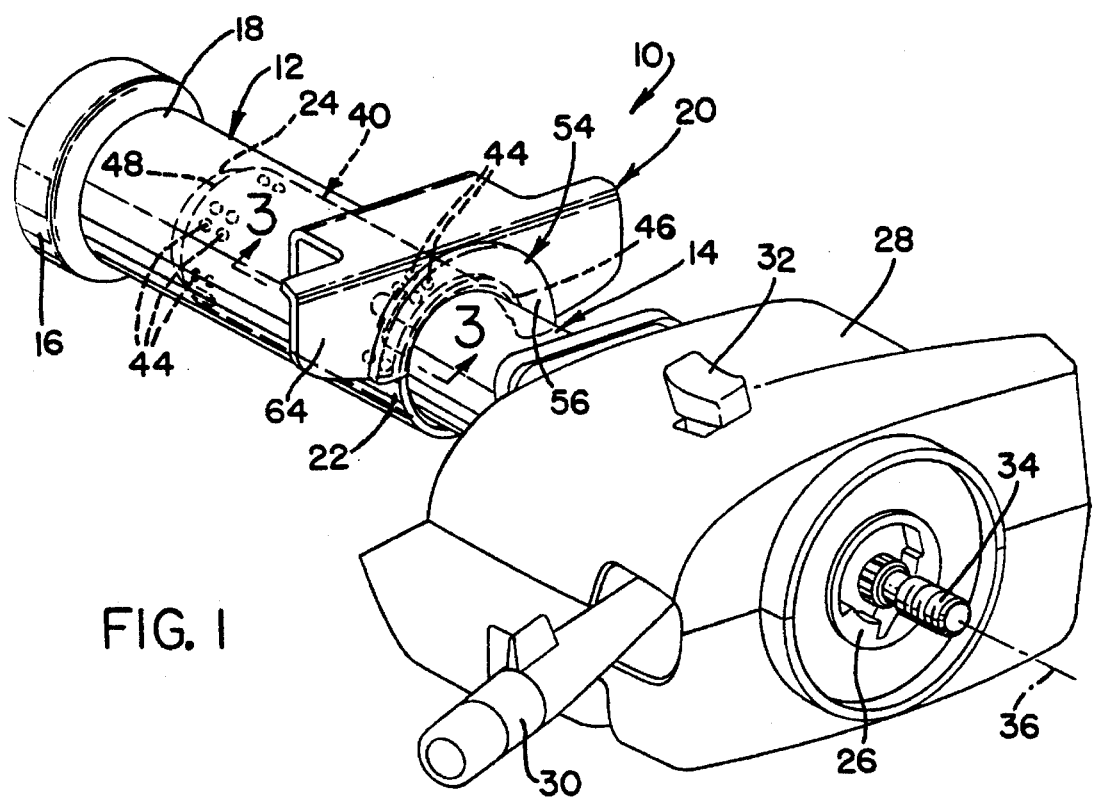
FIG. 1 is a fragmentary perspective view of a motor vehicle steering column according to this invention.
Figure 2:
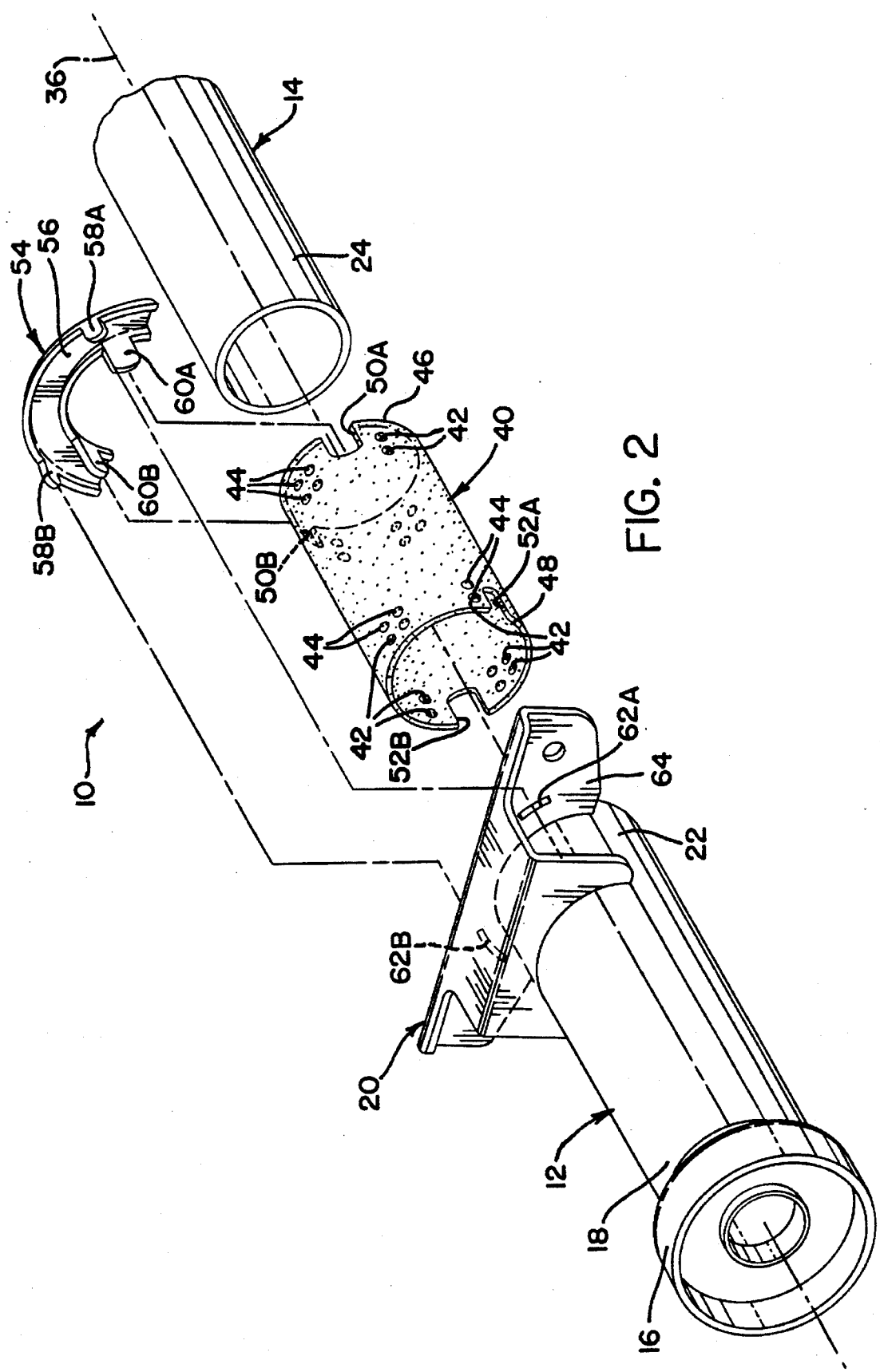
FIG. 2 is a fragmentary exploded perspective view of a motor vehicle steering column according to this invention.

As seen best in FIGS. 1–2, a motor vehicle steering column 10 according to this invention includes a tubular lower mast jacket 12 and a tubular upper mast jacket 14. A schematically represented inboard bracket 16 is rigidly attached to the lower mast jacket 12 at a corresponding inboard end 18 thereof for anchoring the lower mast jacket on a front wall, not shown, of a passenger compartment of a motor vehicle. An outboard bracket 20 is welded to the lower mast jacket 12 adjacent an outboard end 22 of the latter, FIGS. 2–3. The outboard bracket 20 is rigidly connected to mounting structure, not shown, on the vehicle body.

The tubular upper mast jacket 14 is telescopically received inside the lower mast jacket and includes an inboard end 24 inside the lower mast jacket and an outboard end 26. A schematically represented escutcheon 28 is mounted on the upper mast jacket 14 and conceals apparatus of the steering column including, for example, switches operated by a turn signal lever 30 and by an emergency warning flasher actuator 32. A steering shaft 34 is supported on the upper and lower mast jackets for rotation about a longitudinal centerline 36 of the steering column. A steering wheel, not shown, is mounted on an end of the steering shaft in the usual fashion.

Figure 3:
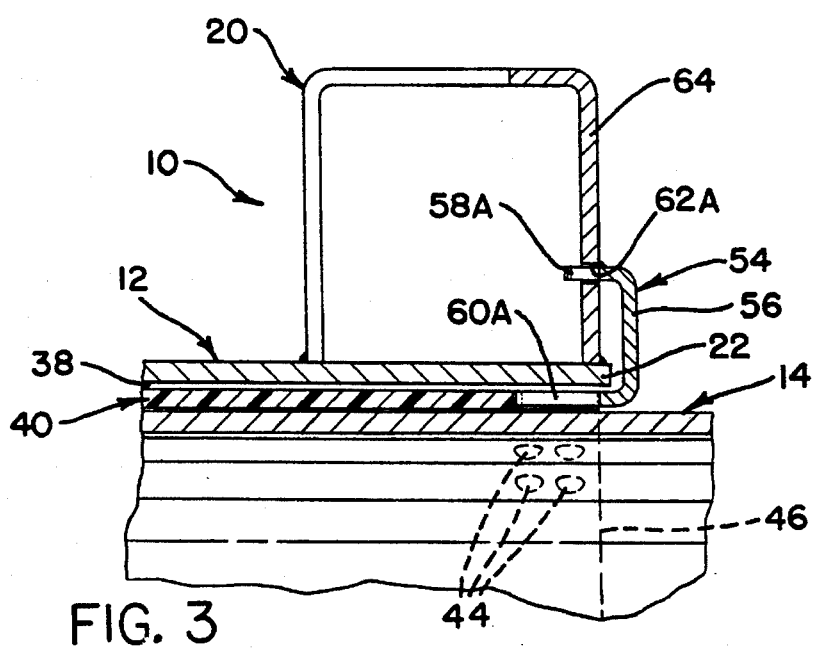
FIG. 3 is an enlarged sectional view taken generally along the plane indicated by lines 3—3 in FIG. 1.

An annulus 38, FIG. 3, is defined at the overlap between the outboard end 22 of the lower mast jacket and the inboard end 24 of the upper mast jacket. A tubular plastic ball sleeve 40 of the steering column 10 has a plurality of pockets 42 therein each of which loosely holds one of a plurality of substantially identical steel spheres 44. The diameter of each sphere 44 exceeds the wall thickness of the ball sleeve and, by a closely controlled difference, the radial depth of the annulus 38. The ball sleeve 40 has a first circular edge 46 at one end and a second circular edge 48 at the other end each of which is interrupted by a pair of notches 50A–B, 52A–B, respectively, each separated circumferentially by identical angular intervals.

As described generically in the aforesaid U.S. Pat. No. 3,392,599, the upper and lower mast jackets 14,12 are assembled by forcing the inboard end 24 of the upper mast jacket 14 into the outboard end 22 of the lower mast jacket 12 with the ball sleeve 40 and the steel spheres 44 therebetween. The ball sleeve 40 can be assembled with edge 48 first or with edge 46 first. As the annulus 38 envelops the spheres 44, the relative longitudinal movement between the upper and lower mast jackets and the degree of interference between the spheres and the mast jackets causes the spheres to roll tracks into the mast jackets. In a fully assembled position of the upper mast jacket 14 relative to the lower mast jacket 12, FIG. 1, the ball sleeve 40 is fully shrouded in the annulus 38 with first edge 46 thereof, for example, facing out and exposed through the outboard end 22 of the lower mast jacket 12.

After the mast jackets 12,14 are assembled together as described above, an arc-shaped anti-rotation bracket 54 is fitted to the support bracket 20. The anti-rotation bracket has a flat body 56 in a plane perpendicular to the centerline 36, a pair of weld tabs 58A–B, and a pair of tangs 60A–B separated by the same included angle as between the notches 50A–B and 52A–B in the edges 46 and 48, respectively, of the ball sleeve 40. With the ball sleeve oriented angularly about the centerline 36 such that the pair of notches 50A–B in the circular edge 46 are aligned with the tangs 60A–B on the anti-rotation bracket, the tangs 60A–B seat in corresponding ones of the notches 50A–B and the weld tabs 58A–B seat in a corresponding pair of slots 62A–B in a vertical face 64 of the outboard bracket 20 when the body 56 abuts the outboard end of the lower mast jacket. In that circumstance, the tangs positively prevent rotation of the ball sleeve about the centerline 36 while freely separating from the notches 50A–B in the direction of the longitudinal centerline 36 so as to not interfere with an energy absorbing telescopic collapse stroke of the upper mast jacket 14 into the lower mast jacket 12. The anti-rotation bracket 54 is retained on the outboard bracket 20 by welding the tabs 58A–B to the bracket 20 behind the vertical face 64.

In steering columns such as described in the aforesaid U.S. Pat. No. 3,815,438, where the upper mast jacket is connected to the vehicle body only through the lower mast jacket, some anti-theft systems on the upper mast jacket may be susceptible to defeat by forced rotation or twist of the upper mast jacket relative to the lower mast jacket about the longitudinal centerline of the steering column. In such steering columns, where the ball sleeve is unrestrained, twist begins at a turning moment magnitude sufficient to start the steel spheres rolling between the mast jackets. That magnitude is relatively low because the interference fit between the spheres and the mast jackets is calculated to afford resistance commensurate only with forces sustainable by a human driver during a collapse stroke of the steering column.

In the steering column 10, however, with the tangs 60A–B positively preventing rotation of the ball sleeve 40 about the centerline 36, the spheres 44 are effectively prevented from rolling easily between the mast jackets. That is, whereas an unrestrained ball sleeve is simply pulled along by the rolling spheres, the restrained ball sleeve 40 forces the spheres to either skid between the mast jackets or to roll in place in their respective stationary ball sleeve pockets. In either circumstance, the turning moment on the upper mast jacket necessary to initiate cold forming of the mast jackets by the spheres is significantly higher than when the spheres are permitted to roll freely and is high enough, when exceeded, to cause collateral damage to the steering column sufficient to render the vehicle undriveable anyway. Therefore, forcibly twisting the upper mast jacket 14 will not effectively defeat the anti-theft system on the steering column.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A motor vehicle steering column comprising:

a tubular lower mast jacket rigidly attached to a vehicle body and having an outboard end, a tubular upper mast jacket disposed telescopically inside said lower mast jacket and cooperating therewith in defining an annulus at an overlap between an inboard end of said upper mast jacket and said outboard end of said lower mast jacket, a tubular ball sleeve in said annulus having a first circular edge at a first end thereof exposed through said outboard end of said lower mast jacket and a second circular edge at a second end thereof and a plurality of pockets therein, a plurality of steel spheres loosely received in respective ones of said pockets and interference fit between said upper and said lower mast jackets operative to rigidly support said upper mast jacket on said lower mast jacket in cantilever fashion and to roll tracks in said upper and said lower mast jackets during an energy absorbing collapse stroke of said steering column characterized by relative telescopic bodily movement between said upper and said lower mast jackets in the direction of a longitudinal centerline of said steering column, an anti-rotation bracket means rigidly mounted on said vehicle body, and means on said anti-rotation bracket means and on said tubular ball sleeve cooperating in positively preventing rotation of said ball sleeve about said longitudinal centerline of said steering column while permitting longitudinal translation of said ball sleeve in the direction of said longitudinal centerline during said energy absorbing collapse stroke of said steering column.

2. The motor vehicle steering column recited in claim 1 wherein said anti-rotation bracket means includes:

an anti-rotation bracket, and means rigidly mounting said anti-rotation bracket on said lower mast jacket adjacent said outboard end thereof.

3. The motor vehicle steering column recited in claim 2 wherein said means on said anti-rotation bracket means and on said tubular ball sleeve cooperating in preventing rotation of said ball sleeve about said longitudinal centerline of said steering column while permitting bodily movement of said ball sleeve in the direction of said longitudinal centerline includes:

means on said ball sleeve defining a first notch open through said first circular edge of said ball sleeve, and means on said anti-rotation bracket defining a first tang projecting into said annulus through said outboard end of said lower mast jacket and seating in said first notch.

4. The motor vehicle steering column recited in claim 3 wherein said means on said anti-rotation bracket and on said tubular ball sleeve cooperating in preventing rotation of said ball sleeve about said longitudinal centerline of said steering column while permitting bodily movement of said ball sleeve in the direction of said longitudinal centerline further comprises:

means on said ball sleeve defining a second notch open through said first circular edge of said ball sleeve separated circumferentially from said first notch by a predetermined included angle, and means on said anti-rotation bracket defining a second tang separated from said first tang by said predetermined included angle and projecting into said annulus through said outboard end of said lower mast jacket and seating in said second notch.

5. The motor vehicle steering column recited in claim 4 further comprising:

means on said ball sleeve defining a pair of notches each identical to said first and said second notches open through said second circular edge and separated circumferentially from each other by said predetermined included angle so that each of said first and said second tangs seats in a corresponding one of said pair of notches when said ball sleeve is disposed in said annulus with said second circular edge exposed through said outboard end of said lower mast jacket.

* * * * *